April 13, 1926.
DE WITT T. KERN
1,580,206
CONFINING AND HOUSING DEVICE
Original Filed Nov. 6. 1922    2 Sheets-Sheet 1
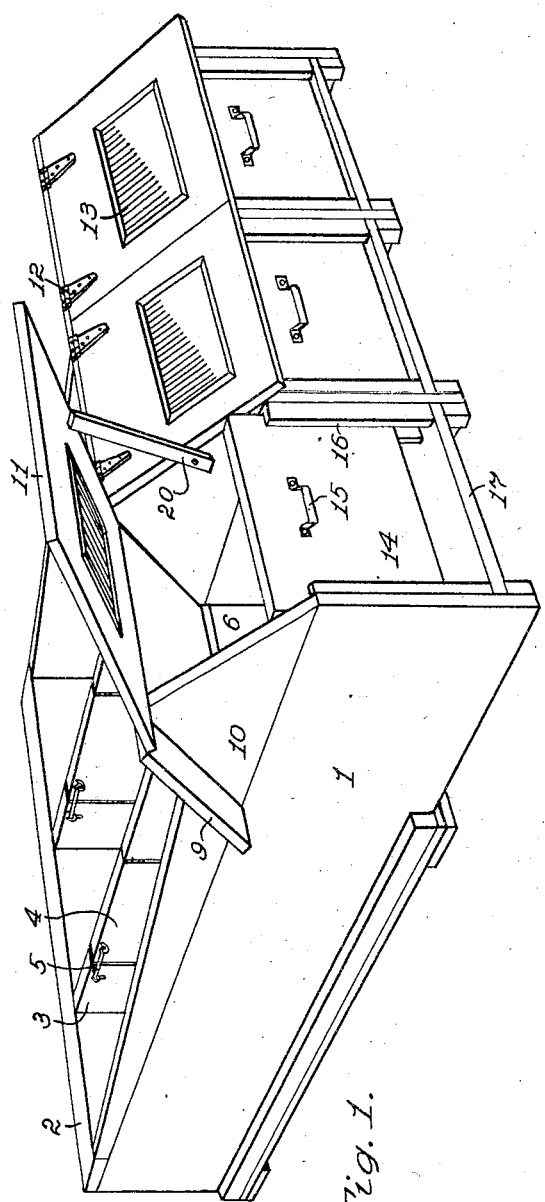
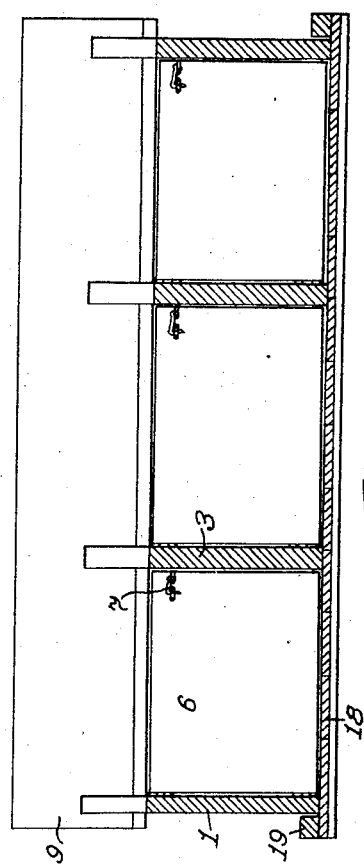
Inventor
D. T. Kern,
By G. C. Kennedy,
Attorney

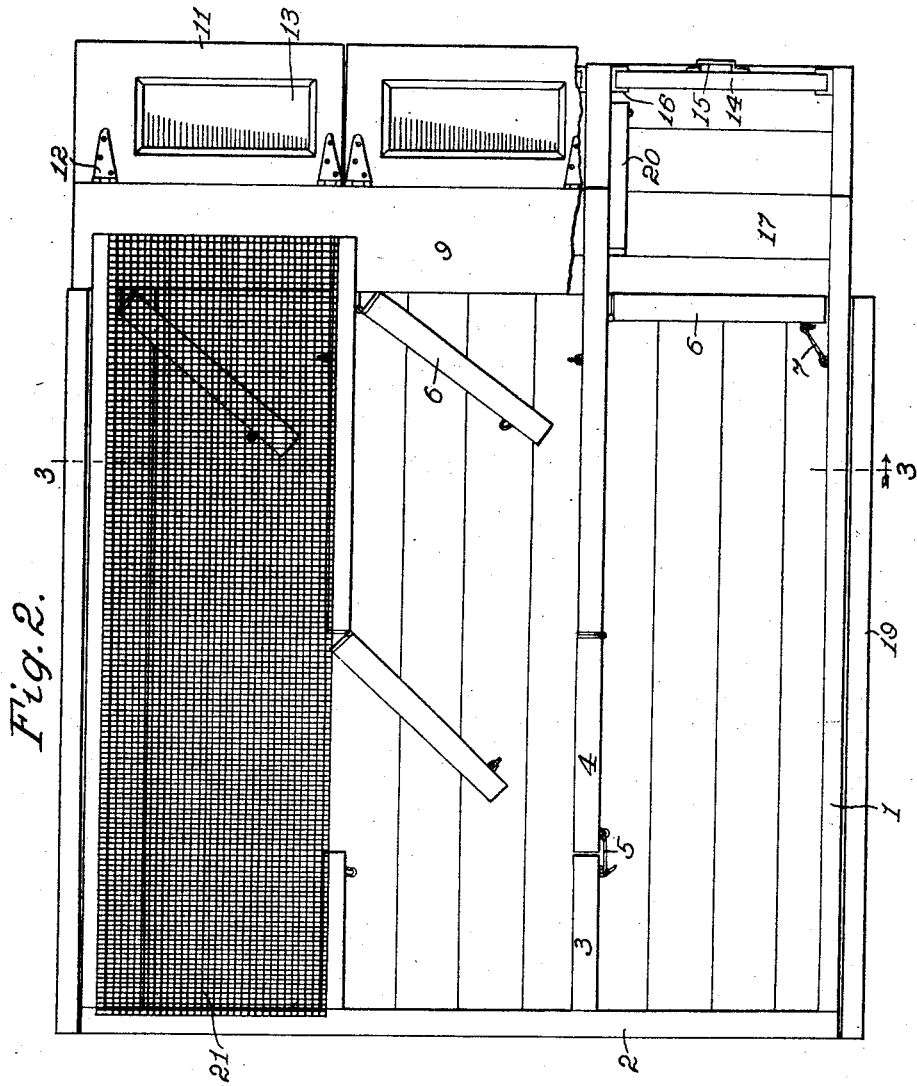

Patented Apr. 13, 1926.

1,580,206

UNITED STATES PATENT OFFICE.

DE WITT TALMAGE KERN, OF KERR ROBERT, SASKATCHEWAN, CANADA.

CONFINING AND HOUSING DEVICE.

Application filed November 6, 1922, Serial No. 599,344. Renewed September 14, 1925.

*To all whom it may concern:*

Be it known that I, DE WITT TALMAGE KERN, a subject of the King of Great Britain, and a resident of Kerr Robert, Saskatchewan, Canada, have invented certain new and useful Improvements in Confining and Housing Devices, of which the following is a specification.

My invention relates to improvements in confining and housing devices, and the object of my improvement is to supply for occupancy by fowls or animals a combination enclosed housing and yard enclosure, both divided into intercommunicating compartments, the housing having adjustable hinged glazed roof sections, and the yard enclosure having a removable floor, to permit keeping these structures in a well-lighted, ventilated and sanitary condition.

This object I have accomplished by the means which are hereinafter described and claimed, and which are illustrated in the accompanying drawings, in which Fig. 1 is a perspective view of my device, and Fig. 2 is a top plan thereof, with parts broken away, and Fig. 3 is a transverse vertical section thereof taken on the line 3—3 of Fig. 2, looking in the direction indicated by the arrow, but showing the housing inner doors closed.

This device comprises in combination an enclosed housing having a permanent floor 17 and a peaked roof of which one sloping part or section 9 is imperforate and fixed across the end walls 1, while the other sloping part of the roof is composed of longitudinally alined and abutted sections 11 each provided with a glazed window 13, although instead of glazing each window may be open or be covered by netting or other orificed covering to keep out vermin or birds while also keeping in fowl or animals.

These roof sections are hinged to the fixed roof section 9 by means of hinges 12, and each section 11 may be held releasably in an elevated position adjustably by means of any appropriate means such as a bar or prop 20 pivoted at one end to one of the compartment partitions 3 within the housing.

These partitions 3 thus divide the housing into a plurality of compartments having doorways at opposite ends of each. The outer doorway of each compartment is furnished with channel bars 16 in whose channels doors 14 are vertically slidable, each door having on its outer face a handle 15 for manual use. Each inner doorway has a hinged door 6, and releasable connections such as the hooks and staples 7 secure the doors releasably.

The end walls 1 of the housing prolonged provide the opposite side walls of the yard enclosure which latter has the end closure wall 2 and partitions 3. The partitions 3 have doorways supplied with hinged doors 4 secured releasably by means of hook and staple fasteners 5, whereby communication may be had between the yards, if desired.

The top and bottom of the partitioned yard enclosure are left open preferably. A floor 18 is provided for this enclosure with ends extended under the walls 1 and 2, and beams 19 are fastened upon opposite projecting ends of this floor to abut upon the outer walls 1 on the outside to hold the floor in place, yet permit the housing and enclosure to be removed slidingly therefrom. Thus, when the floor has been uncovered by removal of the enclosure from above it, it may be cleansed sanitarily and then replaced. The open top of the enclosure may be covered by a wire netting 21 as indicated in Fig. 2 only, to prevent escape of winged fowl, or to keep out birds or animals of prey.

The fowl or animals enclosed and housed in this combination structure are by said means permitted sufficient light and ventilation, and secured from preying animals or birds.

Having described my invention, what I claim as new, and desire to secure by Letters Patent, is:

1. In combination, a housing partitioned into a plurality of rooms, each room having doorways at its opposite ends and doors for said doorways, a walled enclosure, open at top and bottom and having partitions dividing it into spaces respectively in communication with certain of said doorways, said last-mentioned partitions having doorways and doors therefor, and a flooring positioned across the open bottom of said walled enclosure, having stop side beams abutting upon the opposite side walls of the enclosure, the enclosure and housing being slidably removable from said flooring.

2. In combination, a floored housing having doorways and movable closures therefor, an open bottom walled enclosure in communication with one of said doorways, and a floor upon which said walled enclosure is positioned, said floor having raised parts abutting upon opposite walls of said enclosure to permit sliding removal of the enclosure from the floor.

Signed at Waterloo, Iowa, this 6th day of October, 1922.

DE WITT TALMAGE KERN.